Jan. 8, 1929.
F. H. GOODRICH
BUMPER
Filed Oct. 15, 1925
1,698,696
2 Sheets-Sheet 2
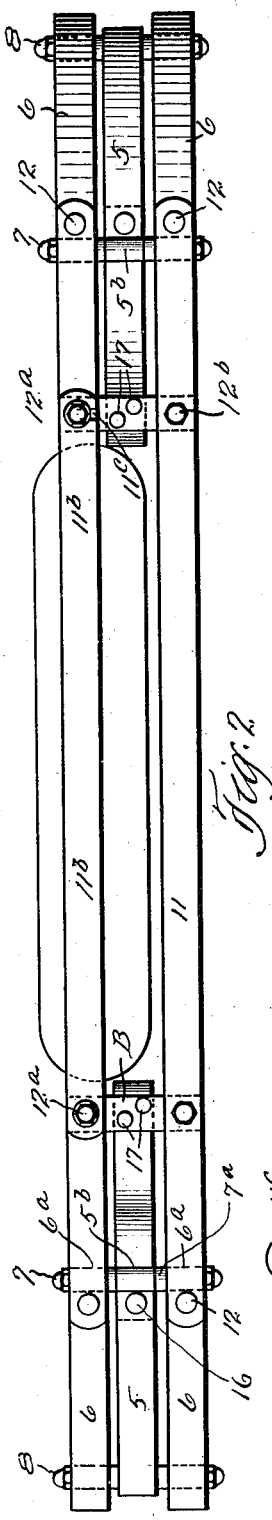
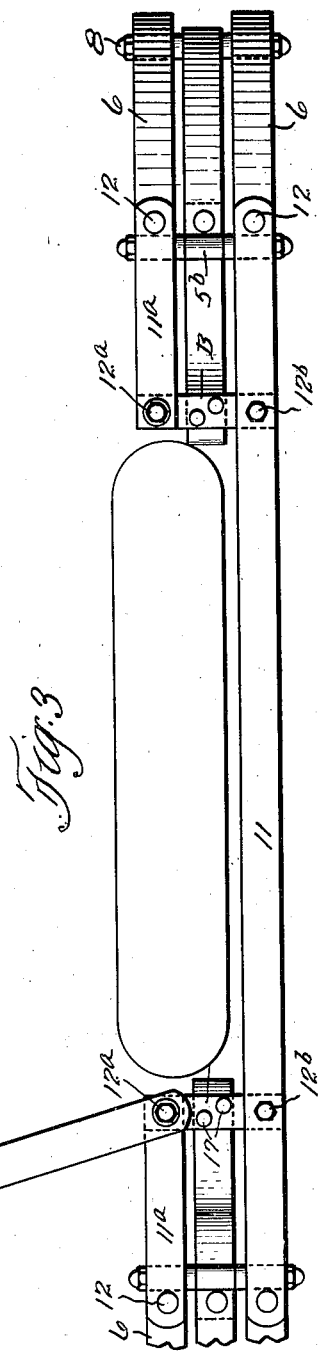
Inventor
F. H. Goodrich,
By Hull, Brock & West
Attys.

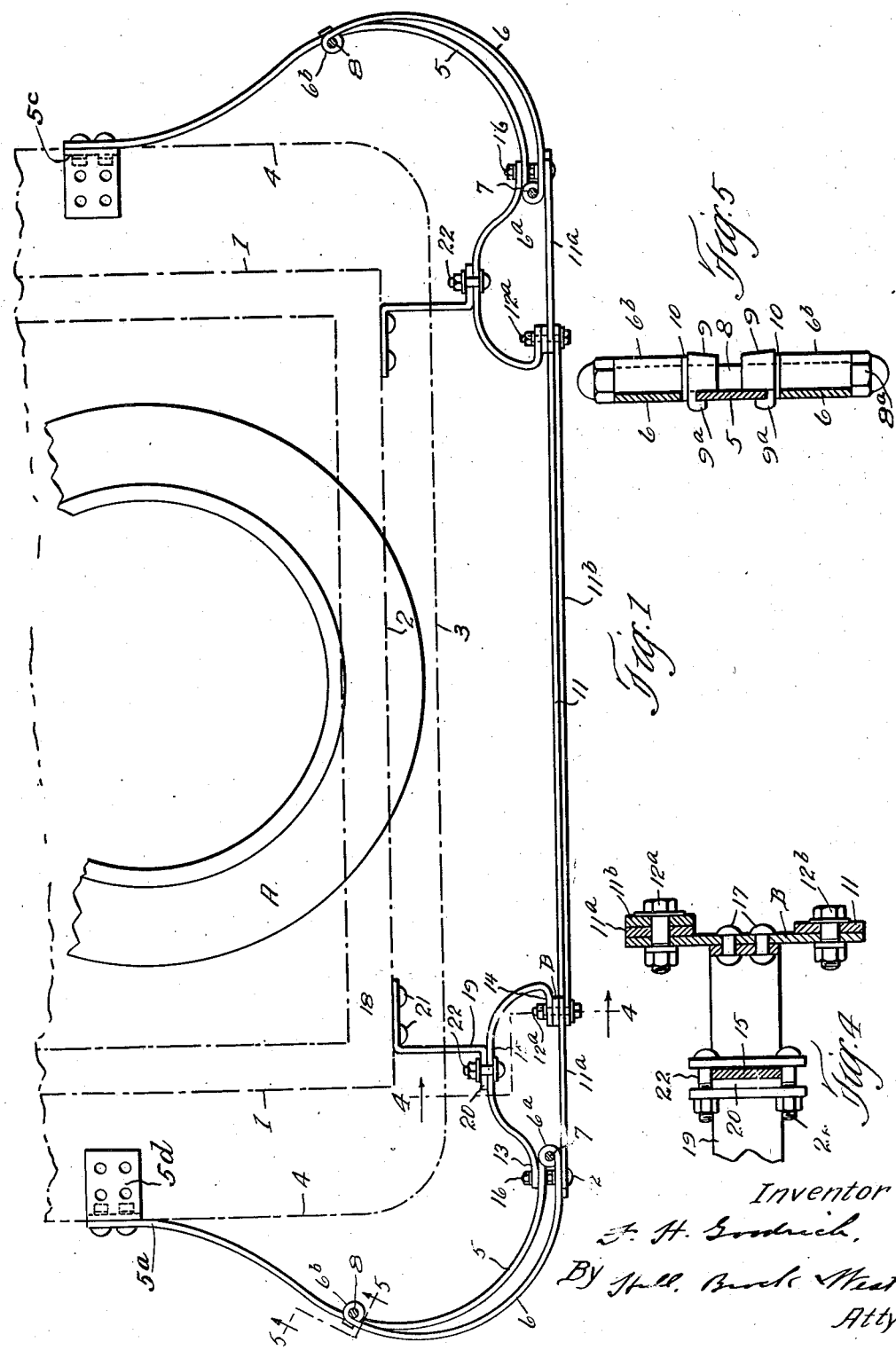

Patented Jan. 8, 1929.

1,698,696

UNITED STATES PATENT OFFICE.

FRANCIS H. GOODRICH, OF DETROIT, MICHIGAN, ASSIGNOR TO THE C. G. SPRING AND BUMPER COMPANY, OF DETROIT, MICHIGAN, A CORPORATION OF DELAWARE.

BUMPER.

Application filed October 15, 1925. Serial No. 62,505.

This invention relates to bumpers for automobiles, and more particularly to bumpers for the rear ends of such vehicles. The particular embodiment of the invention illustrated herein is especially adapted for combined rear-bumper and corner guard-construction for use on omnibuses.

It is the general purpose and object of the invention to provide a bumper of this character which is adapted to permit the convenient installation of a spare tire in the compartment or upon the support in front of the rear of such bumper as well as the convenient removal of the tire from such compartment or support whenever occasion may require. The bumper shown herein is of the general type of that disclosed in Patent No. 1,546,948 issued July 21, 1925, to the C. G. Spring & Bumper Company of Detroit, Michigan, as assignee of Edgar A. Sohl, but differs therefrom in the particulars pointed out hereinafter.

Referring to the drawings, Fig. 1 represents a plan view of a bumper constructed in accordance with my invention and indicating a tire in a space or compartment in front of the bumper and in the rear of the vehicle, the cooperating parts of the vehicle being shown in dot-and-dash lines and certain bolts being shown in section; Fig. 2 a rear elevation of the bumper and part of the spare tire; Fig. 3 a view, similar to Fig. 2 and showing the positions of the parts when it is desired to have access to the tire; Fig. 4 a sectional view corresponding to the line 4—4 of Fig. 1; and Fig. 5 a sectional view corresponding to the line 5—5 of Fig. 1.

Describing the various parts by reference characters, 1 represents the rear ends of the side members and 2 the rear cross member of a vehicle frame, 3 the rear end of the body and 4 the rear end of the side of the body which is carried by the said frame.

The complete bumper comprises a pair of curved resilient attaching bars secured at their front or inner ends to the sides of the body, a pair of curved corner guard members secured to each of the attaching bars, an impact section comprising impact bars connected to the corner-guard members, and rearwardly or inwardly extending cushion bars connected to the impact bars and to the inner ends of the attaching members and interposed between the sides of the bumper and the vehicle.

The two attaching bars are indicated generally at 5 and each has a front or inner end $5^a$ which is bolted or otherwise secured to an angle iron clip $5^c$, one flange of which is bolted beneath the bottom of the body, as indicated at $5^d$. The attaching members are each curved laterally and rearwardly (or outwardly) and inwardly, to provide a resilient protection for their respective corners of the vehicle as well as a support for the additional corner guard members. The rear or outer end of each attaching bar is provided with an eye $5^b$ (see Figs. 2 and 3). This eye is interposed between eyes $6^a$ on the rear or outer ends of resilient corner-guard bars or members 6, there being a pair of vertically spaced corner guard members at each end of the bumper construction. Aligned eyes $6^a$ and $5^b$ are connected by means of bolts 7, there being washers $7^a$ interposed between the vertically aligned eyes at each end of the bumper. The corner guard members are curved outwardly and forwardly from their respective eyes $6^a$ and project beyond the corresponding curved corners of the attaching bars 5, the front ends of the bars 6 crossing the adjacent portions of their corresponding bars 5 and each being provided at such front end with an eye $6^b$, the aligned upper and lower eyes $6^b$ at each end of the bumper structure being connected by a bolt 8. Each bolt is provided with a pair of sleeves 9 thereon, each sleeve having a seat $9^a$ therein adapted to receive the upper and the lower edge, respectively, of the adjacent bar 5, there being spacing washers 10 interposed between each eye $6^b$ and the sleeve 9 adjacent thereto which spacing washers are adapted to be engaged by the bars 6. By setting up the nuts $8^a$ on the bolts 8, the eyes $6^b$ are forced toward each other, thereby forcing the clamping sleeves 9 toward each other and firmly securing the front ends of the corner guard bars to the attaching bars 5.

11 denotes a lower impact bar which extends across the space between the ends of the lower corner bars 6, being secured to the latter bars by bolts 12. It will be noted, by reference to Figs. 2 and 3, that the spare tire A is carried in front of the central portion of the bumper. These tires are usually carried in compartments in the rear of omnibuses and the body of the tire shown herein is slightly above the bar 11. The upper impact bar which is connected to the ends of the upper corner bars 6 is made in three sections, the central section being pivoted at one end to permit access to the tire and to the compartment or support therefor. The end sections 11ª of the upper bar are each bolted at its outer end to the corresponding corner bar 6 by means of a bolt 12, the inner end of each section 11ª being secured to a vertical strap B by means of a bolt, indicated at 12ª. The lower ends of the straps B are bolted to the lower impact bar 11, as shown at 12ᵇ.

11ᵇ denotes the central section of the upper impact bar which is pivoted at one end to one of the bolts 12ª while being provided at its opposite end with a slot 11ᶜ extending upwardly from the bottom thereof and which is adapted to receive the other bolt 12ª, whereby the section 11ᵇ may be held in place at the rear of the spare tire and of the compartment therefor.

For the purpose of securing the bumper structure to the vehicle frame, it is preferred to use a pair of cushion bars, one at each side of the central portion of the bumper structure and each having its ends fastened to the bumper structure with a forwardly (or inwardly) bowed central portion which may provide means for attaching supporting arms thereto. Each cushion bar comprises an outer end 13, an inner end 14, and a forwardly or inwardly bowed or projecting central portion 15, the construction providing a flattened U-shaped projection to which an attaching arm may be conveniently secured. The end portion 13 of each cushion bar is secured, as by means of a bolt 16, to the adjacent attaching bar 5, while the inner end of each cushion bar is bent outwardly, as shown at 14, and is secured to the plate B by means of rivets 17, the shape of the inner end of each cushion bar enabling the cushioning effect of each such bar to be preserved while providing for ample length in the central section 11ᵇ of the upper impact bar as well as providing a strong and resilient brace at the joints between the sections of the upper impact bar.

The arms which secure the body portions of the bumper to the vehicle frame are shown as of approximately Z-form, comprising each a flattened or flanged front end 18, a rearwardly or outwardly extending intermediate portion 19, and a rear or outer flange 20, which is adapted to bear against the extended central portion 15 of the corresponding cushion bar. The flanges 18 are shown as secured to the rear frame member 2 by means of bolts 21, while the flanges 20 are shown as secured to the central portions of their respective cushion bars by bolts 22 and suitable clamp plates.

The construction shown and described herein provides a triple curved guard for each corner of the vehicle, each guard being composed of an attaching bar and two corner-guard bars, with double impact bars protecting the part of the vehicle between such corners as well as the tire A. When it is desired to obtain access to the tire or to the compartment or support provided therefor, it will be necessary only to slacken up the nut on the appropriate bolt 12ª and then swing the central section 11ᵇ of the upper impact bar about the bolt 12ª as a pivot, as indicated in Fig. 3. By swinging said section 11ᵇ back to the position indicated in Fig. 2 and again setting up the nut on the appropriate bolt 12ª, the section 11ᵇ will operate in the same manner as the corresponding part of the bar 11 to receive impacts and prevent injury to the body thereby.

It is apparent that the central impact section may be used without the corner guards if protection from the latter is unnecessary. It is also apparent that the bar 11ᵇ may be omitted if its additional protection at the central portion of the vehicle is unessential.

Having thus described my invention, what I claim is:—

1. The combination, with the rear of a vehicle having a tire-receiving compartment therein adapted to receive a tire in a substantially horizontal plane, of a bumper carried by the rear of said vehicle and comprising an upper and a lower impact member, one of said members comprising a section extending across such compartment, the said section being pivoted at one end, and means for securing the other end of such section in operative position to constitute an effective part of the last mentioned member.

2. The combination, with the rear of a vehicle having a tire-receiving compartment therein adapted to receive a tire in a substantially horizontal plane, of a bumper carried by the rear of said vehicle and comprising an upper and a lower impact member, one of said members comprising a central section extending across such compartment, the said section being pivoted at one end to swing in a substantially vertical plane, and means for securing the other end of such section in operative position to constitute an effective part of the last-mentioned member.

3. The combination, with an end of a vehicle, of a bumper supported from such end and comprising an upper and a lower impact member, one of said members comprising end sections and an intermediate section, the intermediate section being pivotally connected to one of said end sections and having a vertical slot at its opposite end, and a bolt adapted to enter said slot, said bolt being secured to the opposite end section of said member.

4. The combination, with an end of a vehicle, of a bumper supported from such end and comprising an upper and a lower impact member, one of said members comprising end sections and an intermediate section, the intermediate section being pivotally supported at one end for movement in a substantially vertical plane and having at its opposite end a vertical slot, and a bolt adapted to enter said slot.

5. The combination, with a vehicle, of a pair of attaching bars, each supported at one end by the vehicle, a pair of corner guard bars at each side of the bumper structure and having their front or inner ends secured to their respective attaching bars, forwardly projecting cushion bars, each secured at its outer end to the corresponding corner-guard bars and attaching bars, the inner end of each cushion bar being bent outwardly, a pair of impact bars secured at their ends to the inner portions of the corner-guard bars and each also secured to the inner end of the cooperating cushion bar.

6. The combination, with a vehicle, of an upper and a lower corner-guard bar for each corner of said vehicle, a cushion bar adjacent each side of the vehicle and each having its outer end connected to the inner end of its adjacent corner-guard bar, each cushion bar having a central forwardly projecting portion and each having its inner end projecting outwardly, and upper and lower impact bars secured at their ends to the opposed upper and lower corner-guard bars respectively and each also secured to the inner end of each cushion bar.

7. The combination, with a vehicle, of an upper and a lower corner guard bar for each corner of said vehicle, a cushion bar adjacent each side of the vehicle and each having its outer end connected to the inner ends of the adjacent corner guard bars, each cushion bar having a central forwardly projecting portion and each having its inner end projecting outwardly, upper and lower impact bars connected at their ends to the upper and lower corner-guard bars respectively, one of the impact bars comprising end sections which are so connected to the corresponding corner-guard bars and an intermediate section, a pivot bolt connecting one end of such intermediate section to the inner end of one of the cushion bars, the opposite end of the intermediate section being provided with a slot, and a bolt adapted to extend through said slot and to connect such end of the intermediate section to the inner end of the other cushion bar.

8. The combination, with a vehicle, of an upper and a lower corner guard bar for each corner of said vehicle, a cushion bar adjacent each side of the vehicle and each having its outer end connected to the inner ends of the adjacent corner guard bars, each cushion bar having a central forwardly projecting bar having a central forwardly projecting portion and each having its inner end projecting outwardly, upper and lower impact bars connected at their ends to the upper and lower corner guard bars respectively, one of the impact bars comprising end sections which are so connected to the corresponding corner guard bars and an intermediate section, means pivotally connecting one end of such intermediate section to the inner end of one of the cushion bars, and means for connecting the other end of such intermediate section to the inner end of the opposite cushion bar.

9. A vehicle bumper comprising an impact section including a long bar adapted to extend across and protect the central portion of a vehicle and short bars opposite, spaced vertically from, and connected to, each end portion thereof, said short bars being spaced apart at their inner ends, and means for supporting said impact section from the vehicle.

10. A vehicle bumper comprising an impact section including a long bar adapted to extend across and protect the central portion of a vehicle, short bars opposite, spaced vertically from, and connected to, each end portion thereof, said short bars being spaced apart at their inner ends, and a bar pivotally connected to one of said short bars and adapted to extend across the central portion of the vehicle and be connected to the opposite short bar, and means for supporting said impact section from a vehicle.

11. A vehicle bumper comprising an impact section including a long bar adapted to extend across and protect the central portion of a vehicle, a pair of short bars each of which is opposite, vertically spaced from, and connected to, an end portion of said long bar, said bars being spaced apart at their inner ends, a bar pivotally connected to one of said short bars and adapted to move in a vertical plane with means for fastening the free end of said pivoted bar to the other short bar, and means for supporitng said impact section from the vehicle.

12. In a vehicle bumper the combination of a bar adapted to extend across and protect the rear of a vehicle, and a pair of short bars spaced horizontally from each other and spaced vertically above the end portions of said first mentioned bar, each of said short bars having its end portions connected to the first mentioned bar.

13. In a vehicle bumper the combination of a bar adapted to extend across and protect the rear of a vehicle, a pair of short bars spaced horizontally from each other and spaced vertically above the end portions of said first mentioned bar and connected thereto, and a bar pivotally connected to one of said short bars and adapted to extend across the space between the short bars and be removably connected to the opposite short bar.

14. In a vehicle bumper the combination of a bar adapted to extend across and protect the rear of a vehicle, a pair of short bars spaced horizontally from each other and spaced vertically above the end portions of said first mentioned bar and adapted to be connected thereto, and a cushion bar connected with the end portions of said short bars and extending inwardly therefrom for attachment to a vehicle.

15. In a vehicle bumper the combination with a pair of outwardly bowed corner guards, of a central impact section including a bar connected at its end portions to the inner end portions of said corner guards, and a pair of short bars connected at their outer end portions to said corner guards and at their inner end portions to said first mentioned bar, leaving a space between their inner end portions.

16. In a vehicle bumper the combination with a pair of outwardly bowed corner guards, of a central impact section including a bar connected at its end portions to the inner end portions of said corner guards, a pair of short bars connected at their outer end portions to said corner guards and at their inner end portions to said first mentioned bar, leaving a space between their inner end portions, and a bar pivotally connected to the inner end portion of one of said short bars and adapted to extend across the space between said short bars and be removably connected to the short bar at the opposite side.

17. In a vehicle bumper the combination with a pair of outwardly bowed corner guards, of a central impact section including a bar connected at its end portions to the inner end portions of said corner guards, a pair of short bars connected at their outer end portions to said corner guards and at their inner end portions to said first mentioned bar, leaving a space between their inner end portions, and a cushion support bar connected at its end portions to said impact section and having portions intermediate its ends bent toward the vehicle for support therefrom.

18. In a vehicle bumper the combination with a pair of outwardly bowed corner guards, of a central impact section including a bar connected at its end portions to the inner end portions of said corner guards, a pair of short bars connected at their outer end portions to said corner guards and at their inner end portions to said first mentioned bar, leaving a space between their inner end portions, a bar pivotally connected to the inner end portion of one of said short bars and adapted to extend across the space between said short bars and be removably connected to the short bar at the opposite side, and a cushion support bar connected at its end portions to said impact section and having portions intermediate its ends bent toward the vehicle for support therefrom.

19. A vehicle bumper comprising a pair of outwardly bowed attaching arms adapted to protect the corners of a vehicle, a pair of corner impact bars connected at their end portions to each of said attaching arms and spaced outwardly therefrom intermediate their ends, a rear bar adapted to be connected at its end portions to the inner end portions of opposite corner impact bars, and a pair of short bars each connected at its outer end portion to opposite corner impact bars and connected at its inner end portion to the aforesaid rear bar.

20. A vehicle bumper comprising a pair of outwardly bowed attaching arms adapted to protect the corners of a vehicle, a pair of corner impact bars connected at their end portions to each of said attaching arms and spaced outwardly therefrom intermediate their ends, a rear bar adapted to be connected at its end portions to the inner end portions of opposite corner impact bars, a pair of short bars each connected at its outer end portion to opposite corner impact bars and connected at its inner end portion to the aforesaid rear bar, and means for supporting the intermediate portion of said bumper comprising a cushion bar connected at its ends to the bumper impact section and having a portion intermediate its ends spaced toward said vehicle for support therefrom.

In testimony whereof, I hereunto affix my signature.

FRANCIS H. GOODRICH.